(12) United States Patent
Moerman et al.

(10) Patent No.: US 9,047,121 B2
(45) Date of Patent: Jun. 2, 2015

(54) SYSTEM AND METHOD FOR SCHEDULING JOBS IN A MULTI-CORE PROCESSOR

(71) Applicant: TEXAS INSTRUMENTS INCORPORATED, Dallas, TX (US)

(72) Inventors: Filip Moerman, Tourrettes-sur-Loup (FR); Raphael Defosseux, Cagnes-sur-Mer (FR); Olivier Paviot, Biot (FR)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 175 days.

(21) Appl. No.: 13/776,276

(22) Filed: Feb. 25, 2013

(65) Prior Publication Data

US 2014/0245308 A1    Aug. 28, 2014

(30) Foreign Application Priority Data

Feb. 25, 2013   (EP) .................................... 13290038

(51) Int. Cl.
*G06F 9/46* (2006.01)
*G06F 9/48* (2006.01)
*G06F 9/52* (2006.01)

(52) U.S. Cl.
CPC ............ *G06F 9/4843* (2013.01); *G06F 9/4881* (2013.01); *G06F 9/526* (2013.01); *G06F 2209/483* (2013.01); *G06F 2209/522* (2013.01)

(58) Field of Classification Search
None
See application file for complete search history.

(56) References Cited

U.S. PATENT DOCUMENTS

2007/0011682 A1*  1/2007  Loboz et al. ................... 718/104
2012/0072908 A1*  3/2012  Schroth et al. .................... 718/1

* cited by examiner

*Primary Examiner* — Emerson Puente
*Assistant Examiner* — Steven Do
(74) *Attorney, Agent, or Firm* — Ronald O. Neerings; Frank D. Cimino (57) ABSTRACT

A multi-core processor, comprising a plurality of processor cores to process jobs, a multicore navigator coupled to the plurality of processor cores to evaluate a job for atomicity and, based on determining the job to have atomicity, to determine whether there is an atomic wait queue associated with the job's atomicity. Based on there being an atomic wait queue associated with the job's atomicity, the multicore navigator is to push the job to the atomic wait queue.

17 Claims, 4 Drawing Sheets

SYSTEM AND METHOD FOR SCHEDULING JOBS IN A MULTI-CORE PROCESSOR

CROSS-REFERENCE TO RELATED APPLICATION

The present application claims priority to European Patent Application No. 13290038.2, filed on Feb. 25, 2013; which is hereby incorporated herein by reference.

BACKGROUND

Before the days of multi-core processors, programming for a single processor environment was fairly simple and straight forward. At that time, a programmer may not have needed to worry about processing order due to the single core completing all of the work. However, with the implementation of multi-core processors, programmers had to manage the use of the cores, programmers became more concerned with the processing order of application threads since the threads could be processed in parallel using the separate cores. The necessity to track the threads was partially due to a lack of multi-core runtimes that could manage the processing order of jobs. This lack of order management results in high overheads.

The early multi-core used parallel and logical queues for scheduling jobs. Scheduling in this fashion consumes overhead because the application may be required to track the order in which jobs are processed, as well as control access to shared resources requiring the use of mutex locks. The use of such locks consumes more overhead when a thread happens to spin on a lock. Additionally, threads that require processing in a precise order may potentially be processed out of order if they are not queued or tracked properly, which may result in lock-up. Therefore, a multi-core runtimes that allows programmers to write code as if programming for a single-core processor while utilizing the full parallel processing of the multi-core processor may be desirable.

SUMMARY

The problems noted above are solved in large part by a multi-core processor, comprising a plurality of processor cores to process jobs, a multicore navigator coupled to the plurality of processor cores to evaluate a job for atomicity and, based on determining the job to have atomicity, to determine whether there is an atomic wait queue associated with the job's atomicity. Based on there being an atomic wait queue associated with the job's atomicity, the multicore navigator is to push the job to the atomic wait queue.

Other embodiments are directed toward a multicore navigator comprising a packet engine to schedule jobs to be processed by a plurality of processor cores coupled to the packet engine. The packet engine is to receive jobs into one of a plurality of ready queues, evaluate a job for atomicity, forward a job with no atomicity to one of the plurality of processor cores and, for a job with atomicity, determine whether there is an atomic wait queue associated with the job's atomicity. And, based on there being no atomic wait queue associated with the job's atomicity, forward the job to one of the plurality of processor cores.

Another embodiment is directed toward a method for scheduling atomic jobs comprising receiving jobs into one of a plurality of ready queues, where each ready queue is associated with a different scheduling profile, and evaluating, by a packet engine, a job for atomicity. Based on the job having atomicity, determining whether there is an atomic wait queue associated with the atomicity of the job, and pushing, by a packet engine, the job to the associated atomic wait queue based on there being an atomic wait queue associated with the job's atomicity. And forwarding, by a packet engine, the job to one of a plurality of processor cores based on there being no atomic wait queue associated with the job's atomicity.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections.

As used herein, the term "producer" refers to the originator of a job for processing and the producer may submit the job to a multi-core processor. The producer may refer to a (typically but not limited to programmable) core of the multi-core processor or to a thread of an application running on the core. The producer may also refer to an actor outside the multi-core processor As used herein, the term "consumer" refers to a (typically but not limited to programmable) core of a multi-core processor, which may process a job using an execution object or to a thread of an application running on the core.

As used herein, the terms "atomicity" and "atomic job" refer to a characteristic of a job in which processing jobs of the same atomicity in parallel should be avoided, if possible.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Multi-core processors allow for enhanced processing of applications due to their parallel processing capabilities, but only when applications or operating systems efficiently utilize the separate processing cores. Currently, programmers may either have to rely on operating systems for core management, but these operating systems may not be designed for multi-core processor environments or meet the performance goals of applications involving a high number of light-weight jobs. Else, the programmers may need to manage the cores and the processing order of threads within their applications to fully harness the processing power of a multi-core processor. In either instance, however, the computing overhead may be high and the overall efficiency may suffer if scheduling the jobs on the multiple cores is not properly managed. A multi-core focused runtime may help alleviate these problems. A scheduling component of the new multi-core runtime may be designed to manage and track all jobs queued for processing without programmers needing to perform those functions.

The scheduler component of the new runtime may track and schedule jobs that are sent to it by producers. A producer may either be software running on another core generating jobs or a piece of hardware generating jobs, for example an image sensor or accelerometer. In either instance, the producer may only need to determine what ready queue a job should be placed based on a scheduling profile without requiring to identify a consumer or to determine the state of an atomicity. Using a single queue per scheduling profile simplifies job submissions for producers. The scheduler may evaluate jobs at the head of the ready queue when a core requests a job before forwarding the job to the requesting core. Evaluating the job may be necessary to ensure processing order is maintained. The scheduler may evaluate the jobs for priority, atomicity, and locality. Priority may be designated by a quality of service characteristic and locality may require the job to be processed by a specific core or a specific group of cores. Atomicity may denote jobs that are to be processed serially.

Atomic jobs may involve extra handling and possibly storage due to the nature of atomicity. It may be necessary to prevent jobs of the same atomicity from being processed in parallel. Thus, the scheduler may ensure that atomic jobs of the same atomicity are not processed in parallel. Due to such a constraint, the scheduler may track all atomic jobs from receipt and evaluation through processing by a core. Managing and tracking the atomic jobs is but one aspect of the scheduler and one that may make programming applications that require atomicity simpler.

Disclosed herein are systems and methods for scheduling atomic jobs in a multi-core processor environment. The scheduler may receive jobs into one of a plurality of ready queues where each ready queue is associated with a different scheduling profile. The scheduling profile may be based on priority and locality. Upon receiving a request for a job from a consumer, the scheduler first selects a scheduling profile based on a scheduling policy. The scheduler then looks at an atomic ready queue to see if it holds an end-of-atomic processing notification. The scheduler, then, if the atomic ready queue is empty, analyzes the first job in the ready queue associated with the selected scheduling profile for atomicity. If the job has no associated atomicity, the scheduler forwards the job to the requesting consumer. However, if the job is atomic, the scheduler may perform further analysis to determine if the atomic job can be forwarded to the consumer or if the atomic job should be placed into an atomic wait queue. Further analysis is required because it may be best to avoid processing two atomic jobs of the same atomicity in parallel. However, there may be no constraint to processing two atomic jobs of different atomicity in parallel.

There may be various situations encountered by the scheduler when faced with an atomic job in the ready queue. The scheduler may first determine if an atomic wait queue has been allocated for the atomic job's atomicity. If no atomic wait queue has been allocated, the scheduler may forward the atomic job to the requesting consumer and may also dynamically allocate an atomic wait queue associated for that atomicity thereby locking that atomicity. On the other hand, if an atomic wait queue associated with the job's atomicity has already been allocated, then the scheduler may push the atomic job to the associated atomic wait queue.

If, however, the atomic ready queue held an end-of-atomic processing notification, the scheduler may evaluate the notification before looking at the ready queue. The scheduler may look at the atomic wait queue associated with the atomicity of the notification. If the atomic wait queue holds an atomic job, the atomic job may be forwarded to the requesting consumer. If, however, the atomic wait queue is empty, the scheduler may de-allocate the atomic wait queue, which effectively unlocks that atomicity. Additionally, the scheduler may evaluate the job at the head of the ready queue for atomicity.

Once a consumer finishes processing an atomic job or at least all processing that is covered by the atomicity, the consumer may notify the scheduler that the atomic processing is complete. The notification denotes end-of-atomic processing and is associated with the atomicity of the atomic job the consumer is or just finished processing. The scheduler may then push the end-of-atomic processing notification into an atomic ready queue. The end-of-atomic processing informs the scheduler that an atomic job has finished the part of its processing that is covered by its atomicity and that another atomic job of the same atomicity may now be processed.

Figure 1:
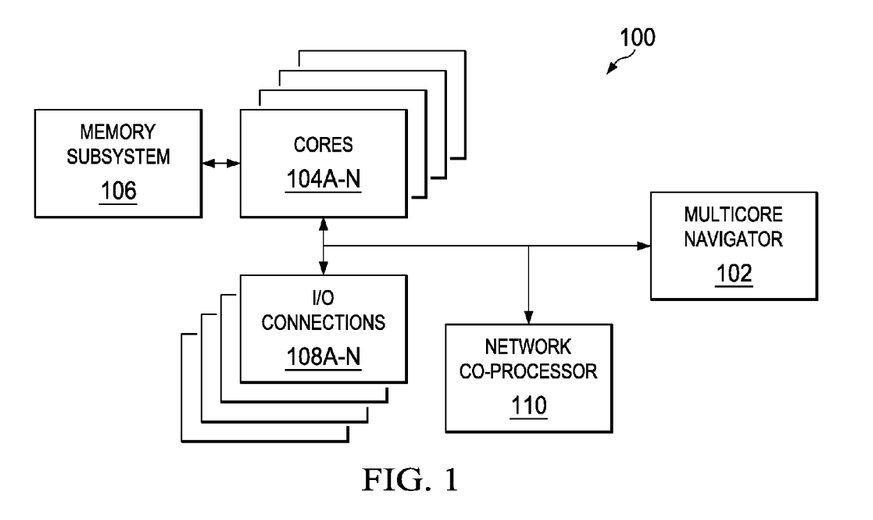
FIG. 1 illustrates an embodiment of a multi-core processor.

FIG. 1 illustrates an embodiment of a multi-core processor 100. Multi-core processor 100 comprises a multicore navigator 102, multiple cores 104A-N, a memory subsystem 106, a number of input/output (I/O) connections 108A-N, and a network co-processor 110. The multicore navigator 102 may schedule and track jobs to be processed by the multiple cores 104A-N. The memory subsystem 106 may be utilized to hold applications and data to be processed and may be used to store data generated from the multiple cores 104A-N. The number of I/O connections 108A-N may be used to receive data for processing by the multiple cores 104A-N and may also be used to transmit data from the multiple cores 104A-N after processing. The network co-processor 110 may be used to transmit and receive data over Ethernet.

The multicore navigator 102 may be used to schedule the processing of jobs on the multiple cores 104A-N. Additionally, the multicore navigator 102 may allocate queues for atomic jobs, hereinafter denoted as atomic wait queues. Those same atomic wait queues may also be de-allocated by multicore navigator 102 when they are no longer required. At any one time, there may be thousands or millions of different atomicities, but only a few that are locked at any instant. Static allocation of atomic wait queues (one per atomicity) would require thousands or millions of atomic wait queues. Dynamic allocation (allocated when atomicity becomes locked, freed when atomicity becomes unlocked), on the other hand, may result in only a few atomic wait queues at any given instant. The scheduler may know that no other atomic job of that atomicity is currently being processed if no atomic wait queue has been allocated for that atomicity. If the atomic wait queue has already been allocated, the scheduler may then know that the atomicity of the atomic job is locked. A locked atomicity implies that no job of that atomicity may be processed. Unlocking the atomicity allows processing of jobs of that atomicity to resume.

The multicore navigator 102 may receive jobs via the I/O connections 108A-N, from the memory subsystem 106, via the network co-processor 110, or from the cores 104A-N. Regardless of the origin of a job, jobs may go into one of a plurality of ready queues before they are evaluated and scheduled. Each of the plurality of ready queues may be associated with a different scheduling profile. Additionally, each ready queue will have an associated atomic ready queue, but the atomic ready queue may not be associated with any specific atomicity. Producers, in this implementation, may only need to locate the correct ready queue without needing to worry about the state of a core or of an atomicity because the multicore navigator 102 may track such specifics. The state of an atomicity may refer to whether or not the atomicity is locked.

The multicore navigator 102 may lock an atomicity by allocating an atomic wait queue associated with that atomicity. The locking of atomicity may occur due to the need to prevent atomic jobs of the same atomicity from being processed in parallel. Conversely, the multicore navigator 102 may unlock atomicity when no atomic job of that atomicity is being processed by de-allocating an associated atomic wait queue. Before unlocking the atomicity, the multicore navigator 102 may determine if there are any atomic jobs in the atomic wait queue. If the atomic wait queue is empty, the multicore navigator 102 may then de-allocate the atomic queue.

In accordance with various embodiments, the multicore navigator 102 may receive a request for a job from a core, such as core 104B. Upon receiving the request, the multicore navigator 102 may first select a scheduling profile. Alternatively, the core may specify a scheduling profile when requesting a job. After selection of the scheduling profile, the multicore navigator 102 may first determine if an atomic ready queue holds an end-of-atomic processing notification. If the atomic ready queue is empty, the multicore navigator 102 may then evaluate the job at the head of the ready queue for atomicity.

In accordance with various embodiments, upon receiving a request for a job form a core, the multicore navigator 102 may first select all scheduling profiles associated with the locality that matches the requesting core. Out of all of those profiles, the multicore navigator 102 may then select all scheduling profiles that have a non-empty ready queue or a non-empty atomic ready queue or both. The multicore navigator 102 may then select the scheduling profile with the highest priority out of the non-empty queues. Thus, once the scheduling profile is selected down to a single profile, the multicore navigator 102 may select a notification out of the atomic ready queue if it is not empty, else the multicore navigator 102 may select a job from the ready queue.

If the job has no atomicity, the multicore navigator 102 may then forward the job to the requesting core. If the job has atomicity, the multicore navigator 102 may then determine if an atomic wait queue has been allocated for that job's atomicity. If an atomic wait queue associated with that atomicity has already been allocated, then the multicore navigator 102 may then push the atomic job to the atomic wait queue. If the multicore navigator 102 determines that there is no atomic wait queue allocated for the atomic job's atomicity, then the multicore navigator 102 may forward the atomic job to the requesting core. Additionally, the multicore navigator 102 may allocate an atomic wait queue associated with the atomicity of the atomic job.

Once a core finishes processing an atomic job or at least all processing that is covered by the atomicity, the core may send the multicore navigator 102 an end-of-atomic processing notification. The multicore navigator 102 may then push the notification into the atomic ready queue associated with the scheduling profile of the ready queue. End-of-atomic processing notifications, upon being evaluated by the multicore navigator 102, may inform the multicore navigator that another job of the same atomicity may now be processed.

In accordance with various embodiments, when the multicore navigator 102 determines that the atomic ready queue associated with the chosen scheduling profile contains an end-of-atomic processing notification, the multicore navigator 102 will evaluate the notification before looking to the ready queue for that scheduling profile. The multicore navigator 102 evaluates the notification by determining if the atomic wait queue of the same atomicity of the notification holds an atomic job. If the atomic wait queue holds an atomic job, that atomic job is forwarded to the requesting core. If, however, the atomic wait queue is empty, then the multicore navigator 102 may de-allocate the atomic wait queue before turning to the ready queue for a job.

Figure 2:
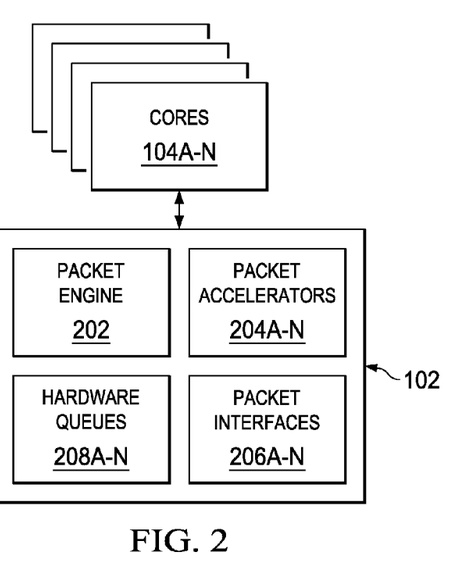
FIG. 2 illustrates an embodiment of a multicore navigator.

FIG. 2 illustrates an embodiment of the multicore navigator 102 coupled to the cores 104A-N. The multicore navigator 102 may be located in a multi-core processor environment on its own chip or as a sector of a multi-core processor chip. The multicore navigator 102 comprises packet engine 200, packet accelerators 204A-N, packet interfaces 206A-N and hardware queues 208A-N. The packet accelerators 204A-N and the packet interfaces 206A-N may assist with Ethernet packet processing operations. The hardware queues 208A-N may be used for ready queues, atomic ready queues, and atomic wait queues, where the atomic wait queues may be dynamically allocated and de-allocated by the packet engine 200. The packet engine 202 may be used for scheduling jobs to be processed by one of the cores 104A-N coupled to the multicore navigator 102. To support high job throughput, a multicore processor may have multiple packet engines to schedule jobs.

The packet engine 202 may schedule all jobs to be processed by the cores 104A-N much in the same as multicore navigator 102 schedules jobs, discussed above in reference to FIG. 1. The packet engine may receive requests for jobs from cores, such as core 104A, or it may track the locked state of each atomicity and forward jobs to a core if atomicity is not locked. In various other embodiments, the packet engine 202 may only track atomic jobs. The tracking of atomic jobs may be required so that the packet engine 202 is able to prevent atomic jobs of the same atomicity from being processed in parallel, if necessary. Additionally, the packet engine 202 may also be required to allocate and de-allocate atomic wait queues for each atomicity received. The atomic wait queues may be allocated in hardware queues 208A-N.

Being able to allocate and de-allocate atomic wait queues as needed may allow all necessary atomic queues to be implemented in hardware queues, such as hardware queues 208A-N, within the multicore navigator 102. The use of hardware queues for the atomic wait queues may have several advantages—low latency when retrieving queued jobs for a core, reduced computing overhead when retrieving and forwarding jobs, and atomic push and pop operations that do not require mutex locks—over queues implemented by software using logical or parallel queue techniques and stored in memory located outside of the multi-core processor environment.

Since the atomic queues are allocated in on-chip hardware, there may be a limited number of queues allocate-able at any one time. By allocating and de-allocating atomic queues as needed, the packet engine 202 may efficiently use the hardware queues 208A-N and may allow all queues to be allocated in the hardware queues 208A-N.

Figure 3:
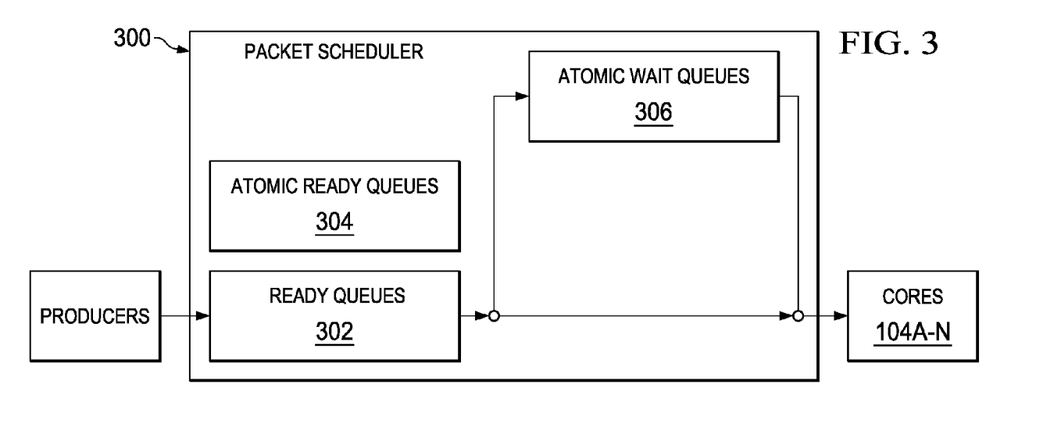
FIG. 3 illustrates an embodiment of a multi-core packet engine.

FIG. 3 illustrates an embodiment of a multi-core packet engine 300. The packet engine 300 comprises one or more ready queues 302, one or more atomic ready queues 304, and one or more atomic wait queues 306. The packet engine 300 may receive jobs from producers and may forward jobs to cores 104A-N. The packet engine 300 may be implemented asynchronously in a multi-core processor's multicore navigator so that the packet engine 300 operates on a separate piece of hardware form each core, as shown in FIG. 1. Alternatively or additionally, the packet engine 300 may be implemented synchronously so that it operates within each core of a multi-core processor. The packet engine 300 may also be used by a multi-core runtime to maintain a status of all atomic jobs and their atomicity.

The packet engine 300 may use the one or more ready queues 302 to receive all incoming jobs from producers with each ready queue 302 associated with a different scheduling profile. The packet engine 300 may use atomic ready queues to hold end-of-atomic processing notifications sent by a core, such as core 104A, upon finishing the processing of an atomic job or at least all processing that is covered by the atomicity associated with that job. Each scheduling profile will have one associated atomic ready queue, so that there are as many atomic ready queues as there are scheduling profiles. The scheduler may guarantee that atomic jobs of the same atomicity are not processed in parallel by implementing atomic wait queues, such as atomic wait queues 306. The multiple atomic wait queues shown in FIG. 3 are for illustration purposes only and the number of atomic wait queues at any one time may vary. However, the number of atomic wait queues may be bounded by the number of consumers or cores of the multi-core processor. Alternatively, the number of atomic wait queues may be bounded by two times the number of cores and potentially further bounded by two times the number of cores times the number of priorities.

The packet engine 300 may dynamically allocate and de-allocate atomic wait queues as it is scheduling jobs. Atomic wait queues may allow the packet engine 300 to guarantee atomic jobs are processed serially. The packet engine 300 may lock atomicity while an atomic job of that atomicity is being processed, thereby satisfying the guarantee. By locking atomicity, no other job of that atomicity may be processed until the atomicity is unlocked. The ability of scheduler 300 to lock atomicity may also allow programmers access to shared resources without using mutex locks.

The packet engine 300 receives jobs into the one or more ready queues 302 from producers. Upon receiving a request for a job from a core, such as core 104A, the packet engine 300 may first choose a scheduling profile. After selecting a scheduling profile, the packet engine 300 may determine if the atomic ready queue, such as one of the atomic ready queues 304, associated with that scheduling profile holds an end-of-atomic processing notification. If the atomic ready queue is empty, the packet engine 300 may then analyze the job at the head of the ready queue 302 of the chosen scheduling profile. The packet engine 300 may then analyze the job for atomicity. If the job has no associated atomicity, the job may be forwarded to the requesting core without constraint.

If the job is determined to be atomic, the packet engine 300 may then perform further analytical steps before either forwarding the atomic job to the requesting core or queuing the atomic job. The first step performed by the packet engine 300 may be to determine if an atomic wait queue, such as one of the atomic wait queues 306, associated with that atomic job's atomicity has been allocated. If no atomic wait queue for that atomicity has been allocated, the packet engine 300 may then know that no other atomic job of the same atomicity has been received or is currently being processed. As such, the packet engine 300 may forward the atomic job to the consumer without violating any atomicity requirements.

After the atomic job is forwarded to the consumer, or concurrently with forwarding the atomic job, the packet engine 300 may also allocate an atomic wait queue for that atomicity, such as one of the atomic wait queues 306. The allocation of an atomic wait queue for that atomicity is carried out by the packet engine 300 so that if more atomic jobs of the same atomicity are received while the current atomic job is being processed, the packet engine 300 may have an atomic wait queue ready in which to hold them. The packet engine 300 may need to store atomic jobs of that atomicity so that the atomic jobs are not processed in parallel, but may be processed in the correct order. The packet engine 300 is designed to lock the atomicity associated with an atomic job while the atomic job is being processed so that no other jobs of that atomicity may be processed concurrently.

In accordance with various embodiments, if the packet engine 300 determines that an atomic wait queue for that atomic job has already been allocated, the scheduler 300 then knows that another atomic job of that atomicity is currently being processed. As such, the atomic job is pushed from the ready queue 302 of the chosen scheduling profile to one of the atomic wait queue 306 associated with the atomic job's atomicity.

Further, upon receiving a request for a job, if the packet engine 300 determines the atomic ready queue contains a notification, the packet engine 300 may then determine if the atomic wait queue associated with that notification contains another atomic job. If the wait queue holds another atomic job, then the packet engine forwards an atomic job to the requesting core. On the other hand, if the atomic wait queue does not contain another atomic job, then the packet engine 300 may de-allocate the atomic wait queue before, concurrently, or after evaluating a job in the ready queue in response to the request.

As the packet engine 300 makes all of these determinations and allocations, it may keep track of all the atomic jobs so that no atomic jobs of the same atomicity are processed in parallel. The packet engine 300 may also have multiple atomic wait queues at any one time, but each atomic wait queue may only be associated with a single atomicity.

While a core is processing an atomic job or after the core has finished processing an atomic portion of a job, the core may send the packet engine 300 an end-of-atomic processing notification. The packet engine 300 may push the notification into the atomic ready queue associated with that scheduling profile. In addition to the notification, the core may also be requesting another job to process. Alternatively, the core may send the request before sending the notification or after sending the notification. The packet engine 300 may first push the end-of-atomic processing notification to an atomic ready queue associated with that scheduling profile. If the request is sent before (or together with) the notification and if the associated atomic wait queue is not empty, the packet engine 300 may pop a job from the atomic wait queue and forward it to the requesting consumer. The following notification from the requesting consumer may then be discarded. Of course, the packet engine 300 may prefer to pop a job from a ready queue or a notification from an atomic ready queue according to the prevailing rules for selecting a scheduling profile.

In accordance with various embodiments, the packet engine 300 may allocate and implement counters associated with each allocated atomic wait queue. The associated counter may store two values—a run count and a max count. The run count may be initialized to zero and the max count may be initialized to a valued provided by the associated atomicity. Then, the packet engine 300 may forward an atomic job to a requesting core if either there is no associated atomic wait queue or there is an atomic wait queue and the run count is less than the max count. The packet engine 300 may de-allocate an atomic wait queue if the atomic wait queue is empty and the associated run count equals zero. The atomic run count may increment each time as associated atomic job is forwarded to a requesting core and decrement each time as associated notification is processed.

Figure 4:
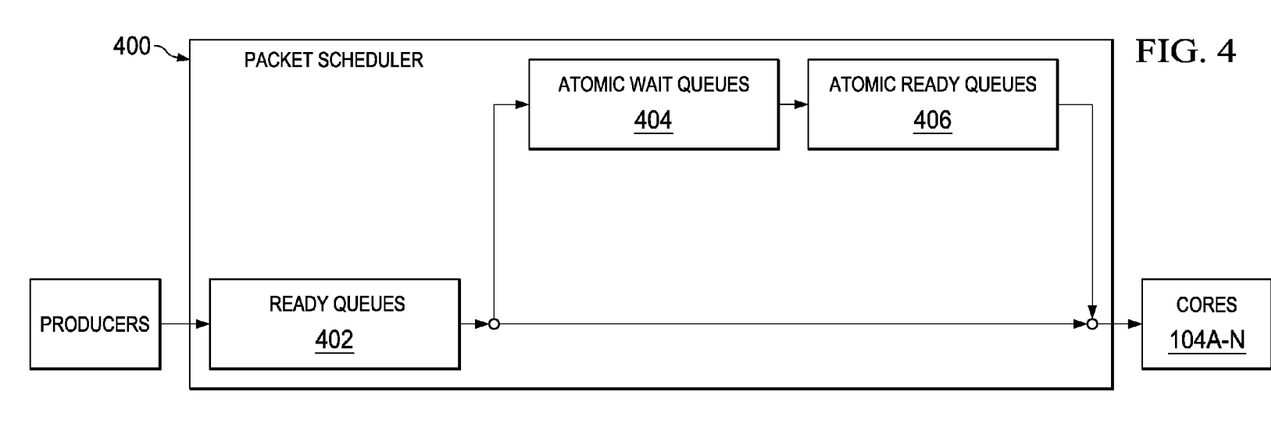
FIG. 4 illustrates an alternative embodiment of a multi-core packet engine.

FIG. 4 illustrates an alternative embodiment of a multi-core packet engine 400. The packet engine 400 comprises one ready queue 402 per scheduling profile, one or more atomic wait queues 404, and one atomic ready queue 406 per scheduling profile. The packet engine 400 receives jobs from producers and forwards jobs to the cores 104A-N.

In accordance with various embodiments, the packet engine 400 may receive a request for a job from one of the cores 104A-N. When responding to a request, the packet engine 400 may first select a scheduling profile based on a scheduling policy. Once a scheduling profile is selected, the packet engine 400 may then determine if the atomic ready queue 406 for that scheduling profile contains an atomic job. If the atomic ready queue 406 for that scheduling profile contains a job, the job is popped by the packet engine 400 and forwarded to the requesting core, such as core 104B. If, however, the atomic ready queue 406 for that scheduling profile does not hold an atomic job, then the packet engine 400 evaluates a job at the head of the scheduling profile's ready queue for atomicity. If the job is non-atomic, the packet engine 400 may then forward the job to the requesting core.

On the other hand, if the job at the head of the ready queue is atomic, then the packet engine 400 may follow many of the same steps as discussed above and performed by the multi-core navigator 102 and the packet engine 300 in reference to FIGS. 1, 2, and 3.

In accordance with this embodiment, upon receiving an end-of-atomic processing from a core, the packet engine 400 may evaluate the atomic wait queue associated with the notification's atomicity to determine if the atomic wait queue holds an atomic job. If the atomic wait does hold an atomic job, then the packet engine 400 may push the atomic job from the atomic wait queue, such as atomic wait queue 404A, to an atomic ready queue associated with the same scheduling profile, such as atomic ready queue 406A. If, however, the atomic wait queue is empty, the packet engine 400 may de-allocate the atomic wait queue effectively unlocking that atomicity.

Figure 5:
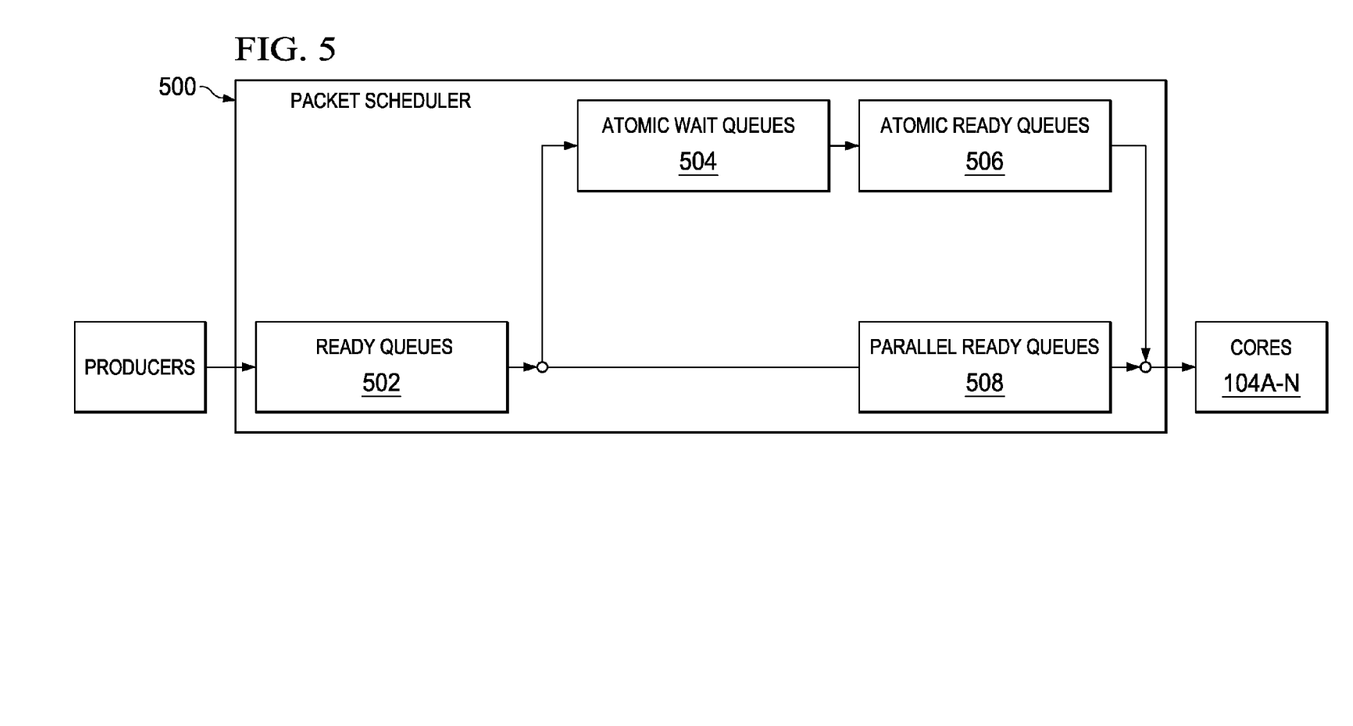
FIG. 5 illustrates another alternative embodiment of a multi-core packet engine.

FIG. 5 illustrates yet another alternative embodiment of a multi-core packet engine, such as packet engine 500. The packet engine 500 comprises one ready queue 502 per scheduling profile, one or more atomic wait queues 504, one atomic ready queue 506 per scheduling profile, and one parallel ready queue 508 per scheduling profile. The one parallel ready queue 508 per scheduling profile may be used to hold non-atomic jobs after they have been evaluated by the packet engine 500. The one parallel ready queue 508 per scheduling profile may also hold atomic jobs that may be processed without waiting. As such, for each scheduling profile, there may be an associated ready queue 502, an associated atomic ready queue 506, and an associated parallel queue 508. Furthermore, for each scheduling profile there may be a dynamically varying number of atomic wait queues depending on the number of atomicities locked at any one time.

In accordance with this embodiment, the packet engine 500 performs much in the same way as the packet engine 400 performs, but with some added evaluation and job movement steps performed in the background and in addition to responding to requests for jobs from cores. The packet engine 500 may be continuously evaluating jobs received into the ready queues without receiving a request for a job from one of the cores 104A-N.

Upon receiving jobs into the ready queues 502, the packet engine 500 may evaluate them for atomicity. The jobs that are not atomic are pushed into the parallel ready queue associated with the same scheduling profile as the ready queue from which the job was received into. For jobs that are determined to be atomic, the packet engine 500 may first determine if there is an atomic wait queue associated with the job's atomicity. If there is an atomic wait queue for that atomicity, the packet engine 500 may push the atomic job to the associated atomic wait queue. If, however, the packet engine 500 determines there is no atomic wait queue associated with the job's atomicity, then the packet engine 500 may push the atomic job to the parallel ready queue and allocate an atomic wait queue for that job's atomicity.

Alternatively or additionally, if the packet engine 500 determines there is no atomic wait queue associated with the job's atomicity, then the packet engine 500 may wait until an atomic wait queue becomes available before pushing the atomic job to the parallel ready queue. Due to the atomic wait queues being implemented in hardware queues, which have a finite number of queues, the packet engine 500 may suspend the background evaluation process once all of the available atomic wait queues have been allocated. The packet engine 500 may then resume the background evaluation process once atomic wait queues have been released and are available to be allocated for a different atomicity.

In accordance with various embodiments, the packet engine 500 may receive a request for a job from one of the cores 104A-N. Upon receiving the request, the packet engine 500 may first select a scheduling profile similar to how the packet engine 400 selects a scheduling profile. Once the packet engine 500 narrows down to a single scheduling profile, the packet engine 500 may first pop a job from the associated atomic ready queue if it is not empty. Otherwise, the packet engine 500 may pop a job form the associated parallel ready queue, if it is not empty. The packet engine 500 may then forward the popped job to the requesting core. The selection and forwarding of jobs to the requesting cores can be separated from the process of evaluating jobs received into the ready queues for atomicity. For example, the packet engine 500 may run the job selecting and forwarding steps synchronously while the job evaluation for atomicity steps are run asynchronously.

Figure 6:
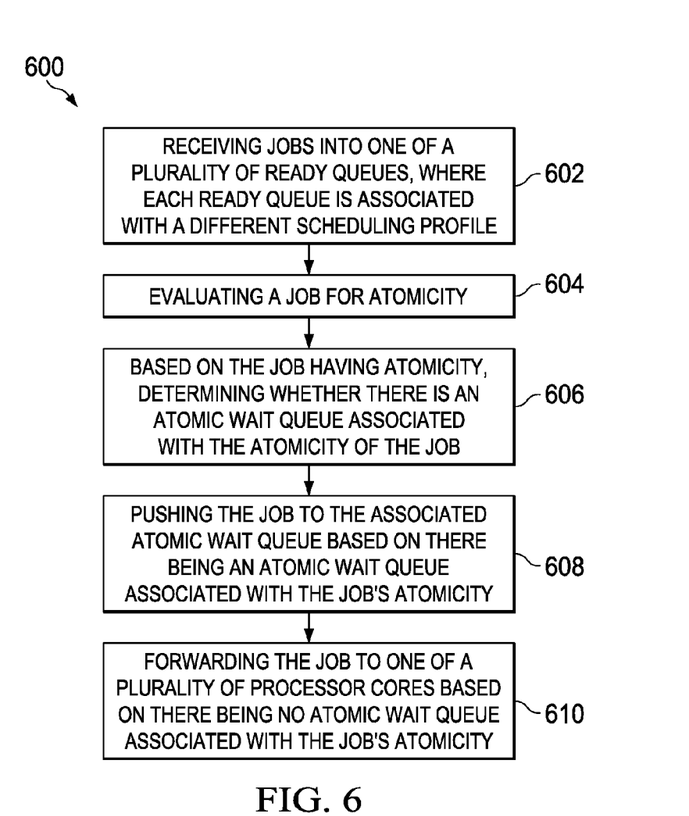
FIG. 6 illustrates a method for scheduling atomic jobs in a multi-core processing environment.

FIG. 6 illustrates a method for scheduling atomic jobs in a multi-core processing environment. The method 500 begins at step 602 with receiving jobs into one of a plurality of ready queues, where each ready queue is associated with a different scheduling profile. The method 600 continues at step 604 with evaluating a job for atomicity, similar to the evaluation processes that the multicore navigator 102 performs. The method 600 then continues at step 606 with, based on the job having atomicity, determining whether there is an atomic wait queue associated with the atomicity of the job. The method 600 then continues at step 608 with pushing the job to the associated atomic wait queue based on there being an atomic wait queue associated with the job's atomicity. Lastly, the method 600 ends at step 610 with forwarding the job to one of a plurality of processor cores based on there being no atomic wait queue associated with the job's atomicity.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A multi-core processor, comprising:
   a plurality of processor cores to process jobs;
   a multicore navigator coupled to the plurality of processor cores to evaluate a job for atomicity and, based on determining the job to have atomicity, determine whether there is an atomic wait queue associated with the job's atomicity;
   based on there being an atomic wait queue associated with the job's atomicity, the multicore navigator pushes the job to the atomic wait queue;
   based on no atomic wait queue being associated with the job's atomicity, the multicore navigator forwards the atomic job to one of the plurality of processor cores and allocates an atomic wait queue associated with the job's atomicity;
   wherein the multicore navigator, based on the job having no atomicity, forwards the job to one of the plurality of processor cores.

2. The multi-core processor of claim 1, wherein the multicore navigator receives jobs into one of a plurality of ready queues.

3. The multi-core processor of claim 1, wherein the multicore navigator evaluates the job upon receiving a request from one of the plurality of processor cores.

4. The multi-core processor of claim 1, wherein the multicore navigator receives an end of atomic notification from one of the plurality of processor and pushes the notification to an atomic ready queue.

5. The multi-core processor of claim 1, wherein, the multicore navigator polls the atomic ready queue for a notification before evaluating a job from the ready queue.

6. A multicore navigator, comprising:
   a packet engine to schedule jobs to be processed by a plurality of processor cores coupled to the packet engine, wherein the packet engine:
   receives jobs into one of a plurality of ready queues;
   evaluates a job for atomicity;
   forwards a job with no atomicity to one of the plurality of processor cores;
   for a job with atomicity, determines whether there is an atomic wait queue associated with the job's atomicity and, based on there being no atomic wait queue associated with the job's atomicity, forward the job to one of the plurality of processor cores;
   wherein the packet engine pushes the job to the atomic wait queue based on there already being an atomic wait queue associated with the job's atomicity; and
   wherein the packet engine allocates an atomic wait queue for the job's atomicity based on no atomic wait queue having already been allocated for the job's atomicity.

7. The multicore navigator of claim 6, wherein the packet engine receives a notification from one of the plurality of processor cores to indicate end-of-atomic processing and the notifications are pushed into an atomic ready queue.

8. The multicore navigator of claim 6, wherein the jobs in the ready queue and notifications in the atomic ready queue are evaluated by the packet engine upon receiving a request for a job from one of the plurality of processor cores.

9. The multicore navigator of claim 6, wherein the packet engine, based on there being a notification in the atomic ready queue, evaluates the notification in the atomic ready queue before evaluating a job in the ready queue, and the packet engine determines if there is an atomic job in the atomic wait queue associated with the notification.

10. The multicore navigator of claim 9, wherein the packet engine, based on there being an atomic job in the atomic wait queue associated with the notification, forwards the atomic job to the requesting core.

11. The multicore navigator of claim 9, wherein the packet engine, based on there not being an atomic job in the atomic wait queue associated with the notification, forwards a job from the ready queue to the requesting core.

12. The multicore navigator of claim 9, wherein the packet engine, based on there not being an atomic job in the atomic wait queue associated with the notification, de-allocates the atomic wait queue.

13. A method for scheduling atomic jobs, comprising:
   receiving jobs into one of a plurality of ready queues, where each ready queue is associated with a different scheduling profile;
   evaluating, by a packet engine, a job for atomicity;
   based on the job having atomicity, determining whether there is an atomic wait queue associated with the atomicity of the job;
   pushing, by a packet engine, the job to the associated atomic wait queue based on there being an atomic wait queue associated with the job's atomicity; and
   forwarding, by a packet engine, the job to one of a plurality of processor cores based on there being no atomic wait queue associated with the job's atomicity;
   allocating, by a packet engine, a new atomic wait queue for the atomic job in a hardware queue based on no atomic wait queue associated with the job's atomicity already having been allocated; and
   wherein the job is forwarded to one of the plurality of processor cores based on the job having no atomicity.

14. The method of claim 13, wherein the job is evaluated upon receiving a request for a job from one of the plurality of processor cores.

15. The method of claim 13, further comprising:
   receiving, by a packet engine, an end-of-atomic processing notification from one of the plurality of processor cores and pushing the notification to an atomic ready queue.

16. The method of claim 13, further comprising:
   based on receiving the end-of-atomic processing notification, determining, by a packet engine, whether the atomic wait queue associated with the atomic job contains any more atomic jobs and, based on the atomic queue containing at least one other atomic job, pushing an atomic job to the front of the ready queue.

17. The method of claim 13, further comprising:
   based on the atomic queue containing no more atomic jobs, de-allocating, by a packet engine, the atomic wait queue after receiving the end-of-atomic processing notification and after evaluating the atomic ready queue upon receiving a request for a job from a core.

* * * * *